US012745274B2

(12) United States Patent
Chen et al.

(10) Patent No.: US 12,745,274 B2
(45) Date of Patent: Sep. 22, 2026

(54) METHODS AND APPARATUSES FOR USER EQUIPMENT SELECTING AND SCHEDULING IN INTELLIGENT WIRELESS SYSTEM

(71) Applicant: Lenovo (Beijing) Limited, Beijing (CN)

(72) Inventors: Wei Chen, Beijing (CN); Lintao Li, Beijing (CN); Xin Guo, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 302 days.

(21) Appl. No.: 18/709,393

(22) PCT Filed: Nov. 12, 2021

(86) PCT No.: PCT/CN2021/130472
§ 371 (c)(1),
(2) Date: May 10, 2024

(87) PCT Pub. No.: WO2023/082207
PCT Pub. Date: May 19, 2023

(65) Prior Publication Data

US 2025/0031230 A1 Jan. 23, 2025

(51) Int. Cl.
*H04L 12/00* (2006.01)
*H04W 72/23* (2023.01)
*H04W 72/51* (2023.01)

(52) U.S. Cl.
CPC ........... *H04W 72/51* (2023.01); *H04W 72/23* (2023.01)

(58) Field of Classification Search
CPC ..... H04W 72/51; H04W 72/23; H04W 24/02; H04W 24/10; G06N 20/00
(Continued)

(56) References Cited

U.S. PATENT DOCUMENTS 11,678,297 B2 * 6/2023 Lee ........................ H04W 72/23 370/312
11,736,908 B2 * 8/2023 Byun ...................... H04W 4/06 370/312

(Continued)

FOREIGN PATENT DOCUMENTS

CN 112911608 A 6/2021
CN 113038616 A 6/2021

(Continued)

OTHER PUBLICATIONS

PCT/CN2021/130472 , “International Search Report and Written Opinion”, International Application No. PCT/CN2021/130472, 7 pages.

*Primary Examiner* — Frantz Coby
(74) *Attorney, Agent, or Firm* — FIG. 1 Patents

(57) ABSTRACT

Disclosed are methods and apparatuses for user equipment (UE) selecting and scheduling in an intelligent wireless system. An embodiment of the subject application provides a base station (BS). The BS includes a processor and a wireless transceiver coupled to the processor. The processor is configured to: obtain a number N and a first channel gain threshold, wherein the number N and the first channel gain threshold are determined based at least in part on uplink channel state information between the BS and multiple UEs; transmit, with the wireless transceiver, a scheduling indicator report configuration to each of the multiple UEs; receive, with the wireless transceiver, multiple scheduling indicators; and select the number N of UEs for participating in local model training according to the multiple scheduling indicators.

20 Claims, 7 Drawing Sheets

100

(58) Field of Classification Search
USPC .......................................................... 370/312
See application file for complete search history.

(56) References Cited

U.S. PATENT DOCUMENTS

| | | | | |
|---|---|---|---|---|
| 11,758,534 | B2* | 9/2023 | Park .................. | H04W 72/1263 370/312 |
| 2008/0267108 | A1* | 10/2008 | Zhang .................. | H04B 7/0805 370/312 |
| 2013/0142103 | A1* | 6/2013 | Tenny ................... | H04W 72/30 370/312 |
| 2015/0092651 | A1* | 4/2015 | Chow .............. | H04B 10/25752 370/312 |
| 2022/0141861 | A1* | 5/2022 | Rico Alvarino ...... | H04L 12/189 370/312 |
| 2023/0108178 | A1* | 4/2023 | Xu ........................ | H04W 76/40 370/312 |
| 2023/0119916 | A1* | 4/2023 | Takeda .................. | H04L 5/0051 370/312 |
| 2023/0132052 | A1* | 4/2023 | Li ..................... | H04W 72/0453 370/312 |
| 2023/0163895 | A1* | 5/2023 | Lee ......................... | H04L 1/189 370/312 |
| 2023/0269828 | A1* | 8/2023 | Shrivastava .......... | H04W 72/30 370/312 |
| 2023/0284244 | A1* | 9/2023 | Xu ........................ | H04W 72/30 370/312 |

FOREIGN PATENT DOCUMENTS

| | | | | |
|---|---|---|---|---|
| WO | 2020180218 | A1 | 9/2020 | |
| WO | 2021158313 | A1 | 8/2021 | |
| WO | WO-2023034500 | A1 * | 3/2023 | ........... G01S 5/0278 |
| WO | WO-2023172292 | A2 * | 9/2023 | ............. G06N 20/00 |

* cited by examiner

800

METHODS AND APPARATUSES FOR USER EQUIPMENT SELECTING AND SCHEDULING IN INTELLIGENT WIRELESS SYSTEM

TECHNICAL FIELD

The present disclosure generally relates to wireless communication technologies, and especially to methods and apparatuses for user equipment (UE) selecting and scheduling in supporting artificial intelligent services in an intelligent wireless system.

BACKGROUND OF THE INVENTION

The rapid development of mobile devices and various networking applications in recent years has led to a sharp growth of the data generated at the network edge. Meanwhile, as the computational power and storage of mobile devices grow, it is attractive to explore the approaches of storing data locally and finishing some computation work on edge clients, which is called edge computing. With the emerging of edge computing and distributed machine learning (ML) technologies, local data storing and processing with global cooperation becomes possible.

However, in recent years people pay more attention to the privacy protection their local raw data. To solve this problem, federated learning (FL) was proposed. FL is considered to have the potential to enable predictive features on smartphones without diminishing the user experience or leaking private information. This is achieved by training machine learning models across a fleet of participating distributed mobile devices without transferring their local private data to a remote centralized server at either the edge or cloud. The objective of the FL training process is to find an optimal global model which minimizes the weighted sum of involved users' losses. The training procedure of FL can be divided into two main steps, i.e., local update and global aggregation. Specifically, the local update is the process in which learning tasks are computed based on local datasets, while the global aggregation is achieved by updating a global model using the uploaded users' local model updates, followed by broadcasting the global model (e.g., parameter(s) of the global model) to them. This procedure repeats until convergence of the global model.

FL becomes a key technique to construct edge computing networks without leaking users' private information and to support the paradigm shift from "connected things" to "connected intelligence," where humans, things, and intelligence are intertwined within a hyper-connected cyber-physical world. This inspires extremely exciting emerging applications, including industrial Internet of Things (IIoT), Internet of Vehicles (IoV), and healthcare. However, the deployment of FL in wireless networks possesses unique challenges in terms of system heterogeneity, statistical heterogeneity, and trustworthiness. Therefore, it is essential to consider the optimization of applying FL in wireless networks.

SUMMARY

Various embodiments of the present disclosure provide solutions related to UE selecting and scheduling for an intelligent wireless system.

According to some embodiments of the present disclosure, a base station (BS) may include a processor and a wireless transceiver coupled to the processor. The processor is configured to: obtain a number N and a first channel gain threshold, wherein the number N and the first channel gain threshold are determined based at least in part on uplink channel state information between the BS and multiple UEs; transmit, with the wireless transceiver, a scheduling indicator report configuration to each of the multiple UEs; receive, with the wireless transceiver, multiple scheduling indicators; and select the number N of UEs for participating in local model training according to the multiple scheduling indicators.

In some embodiments, the processor is configured to obtain the number N and the first channel gain threshold in response to at least one of: a new global model being applied; a global model convergence being achieved; or a convergence speed of a global model being lower than a desired speed.

In some embodiments, to obtain the number N and the first channel gain threshold, the processor is configured to determine the number N based on the uplink channel state information and a historical number of iterations for convergence of a global model, and determine the first channel gain threshold based on the uplink channel state information.

In some embodiments, the first channel gain threshold is a value of a K-th largest channel gain among channel gains received from the multiple UEs, wherein K is an integer not less than the number N.

In some embodiments, to obtain the number N and the first channel gain threshold, the processor is configured to: transmit, with the wireless transceiver, the uplink channel state information to a server; and receive, with the wireless transceiver, the first channel gain threshold and the number N from the server.

In some embodiments, the scheduling indicator report configuration transmitted to a UE includes at least one of: a resource for reporting a scheduling indicator calculated by the UE; the first channel gain threshold; or a report quantity indicating a report of the scheduling indicator of the UE.

In some embodiments, the resource for reporting the scheduling indicator calculated by the UE is indicated as a dynamic granted resource or a configured or preconfigured timing relative to a slot or sub-slot where the UE receives the scheduling indicator report configuration.

In some embodiments, the scheduling indicator report configuration is transmitted via one of: radio resource control (RRC) signaling; medium access control (MAC) control element (CE); downlink control information (DCI); or artificial intelligence related signaling.

In some embodiments, to select the number N of UEs for participating in local model training, the processor is configured to select the number N of UEs with the smallest scheduling indicator values among the multiple scheduling indicators.

In some embodiments, the processor is further configured to: transmit, with the wireless transceiver, a local model report configuration to each of the number N of UEs; and receive, with the wireless transceiver, updated local models from the number N of UEs.

In some embodiments, the local model report configuration transmitted to a UE includes at least one of: a resource for reporting an updated local model of the UE; a global model; or a report quantity indicating a report of the updated local model of the UE.

In some embodiments, the resource for reporting the updated local model of the UE is indicated as a dynamic granted resource or a configured or preconfigured timing relative to a slot or sub-slot where the UE receives the local model report configuration.

In some embodiments, the local model report configuration is transmitted via one of: RRC signaling; MAC CE; DCI; or artificial intelligence related signaling.

In some embodiments, the processor is further configured to: update a global model according to the updated local models; and in the case that convergence of the updated global model is not achieved: transmit, with the wireless transceiver, a local model report configuration containing the updated global model to the number of N UEs for further local model training.

In some embodiments, the processor is further configured to: receive, with the wireless transceiver and from a server, a local model report configuration trigger message including at least one of the following: a maximum latency for reporting local models; identifiers (IDs) of the multiple UEs; a report quantity indicating a report of an updated local model; the number N; an interim report quantity indicating a report of a schedule indicator; a global model; or the first channel gain threshold; and transmit, with the wireless transceiver, the updated local models which satisfy the maximum latency to the server.

In some embodiments, the processor is further configured to: update a global model according to the updated local models; and in the case that convergence of the updated global model is not achieved: determine a second threshold for scheduling indicator according to previously received scheduling indicators; transmit, with the wireless transceiver, a quantized scheduling indicator report configuration to each of the multiple UEs; receive, with the wireless transceiver, multiple quantized scheduling indicators; and re-select the number N of UEs for participating in local model training according to the multiple quantized scheduling indicators.

In some embodiments, the quantized scheduling indicator report configuration transmitted to a UE includes at least one of: a resource for reporting a quantized scheduling indicator of the UE; the second threshold; or a report quantity indicating a report of the quantized scheduling indicator of the UE.

In some embodiment, the quantized scheduling indicator report configuration is transmitted via one of: RRC signaling; MAC CE; DCI; or artificial intelligence related signaling.

In some embodiments, the quantized scheduling indicator includes an acknowledgement (ACK) indicating that a scheduling indicator calculated by the UE is less than the second threshold or a non-acknowledgement (NACK) indicating that the scheduling indicator calculated by the UE is larger than or equal to the second threshold.

In some embodiments, the processor is further configured to: receive, with the wireless transceiver, a second threshold for scheduling indicator from the server; transmit, with the wireless transceiver, a quantized scheduling indicator report configuration to each of the multiple UEs; receive, with the wireless transceiver, multiple quantized scheduling indicators; and re-select the number N of UEs for participating in local model training according to the multiple quantized scheduling indicators.

According to some embodiments of the present disclosure, a UE may include a processor and a wireless transceiver coupled to the processor. The processor is configured to: receive, with the wireless transceiver, a scheduling indicator report configuration including at least one of: a first resource for reporting a scheduling indicator calculated by the UE, a first channel gain threshold, or a report quantity indicating a report of the scheduling indicator of the UE; calculate the scheduling indicator based at least in part on the first channel gain threshold; and transmit, with the wireless transceiver, the calculated scheduling indicator on the first resource.

In some embodiments, the processor is configured to calculate the scheduling indicator based on at least one of local data, a battery condition and/or computing power, or a channel state of the UE in addition to the first channel gain threshold.

In some embodiments, the first resource for reporting the scheduling indicator calculated by the UE is indicated as a dynamic granted resource or a configured or preconfigured timing relative to a slot or sub-slot where the UE receives the scheduling indicator report configuration.

In some embodiments, the scheduling indicator report configuration is received via one of: RRC signaling; MAC CE; DCI; or artificial intelligence related signaling.

In some embodiments, the processor is further configured to: receive, with the wireless transceiver, a local model report configuration including at least one of: a second resource for reporting an updated local model of the UE, a global model, or a report quantity indicating a report of the updated local model of the UE; update a local model by training based on local data; and transmit, with the wireless transceiver, an updated local model on the second resource.

In some embodiments, the second resource is indicated as a dynamic granted resource or a configured or preconfigured timing relative to a slot or sub-slot where the UE receives the local model report configuration.

In some embodiments, the local model report configuration is received via one of: RRC signaling; MAC CE; DCI; or artificial intelligence related signaling.

In some embodiments, the processor is further configured to: receive, with the wireless transceiver, a quantized scheduling indicator report configuration including at least one of: a third resource for reporting a quantized scheduling indicator of the UE, a second threshold for scheduling indicator, or a report quantity indicating a report of the quantized scheduling indicator of the UE; calculate a scheduling indicator; and transmit, with the wireless transceiver, the quantized scheduling indicator based on a comparison between the calculated scheduling indicator and the second threshold on the third resource.

In some embodiments, the quantized scheduling indicator report configuration is received via one of: RRC signaling; MAC CE; DCI; or artificial intelligence related signaling.

In some embodiments, the quantized scheduling indicator is an ACK in response to that the calculated scheduling indicator is less than the second threshold; or the quantized scheduling indicator is a NACK in response to that the calculated scheduling indicator is larger than or equal to the second threshold.

According to some embodiments of the present disclosure, a server may include a processor and a wireless transceiver coupled to the processor. The processor is configured to receive, with the wireless transceiver, uplink channel state information between multiple UEs and a BS; determine a first channel gain threshold and a number N based at least in part on the uplink channel state information, wherein the number N is a number of UEs to participate in local model training; and transmit, with the wireless transceiver, a local model report configuration trigger message including at least one of: a report quantity indicating a report of an updated local model, the number N, an interim report quantity indicating a report of a scheduling indicator, the first channel gain threshold, a maximum latency for reporting local models, or a global model.

In some embodiments, the processor is configured to determine the number N based on the uplink channel state information and a historical number of iterations for convergence of the global model, and determine the first channel gain threshold based on the uplink channel state information.

In some embodiments, the local model report configuration trigger message is transmitted via artificial intelligence related signaling.

In some embodiments, the processor is configured to determine the number N and the first channel gain threshold in response to at least one of: a new global model being applied; a global model convergence being achieved; or a convergence speed of the global model being lower than a desired speed.

In some embodiments, the first channel gain threshold is a value of a K-th largest channel gain among channel gains between the multiple UEs and the BS, wherein K is an integer not less than the number N.

In some embodiments, the processor is further configured to: receive, with the wireless transceiver, updated local models of UEs from the BS; update the global model according to the updated local models; and in the case that convergence of the updated global model is not achieved: transmit, with the wireless transceiver, a local model report configuration trigger message containing the updated global model to the BS for further local model training.

In some embodiments, the processor is further configured to: receive, with the wireless transceiver, scheduling indicators of UEs from the BS; determine a second threshold for scheduling indicator according to the received scheduling indicators in the case that convergence of the updated global model is not achieved; and transmit, with the wireless transceiver, the second threshold to the BS.

According to some embodiments of the present disclosure, a method performed by a BS may include: obtaining a number N and a first channel gain threshold, wherein the number N and the first channel gain threshold are determined based at least in part on uplink channel state information between the BS and multiple UEs; transmitting a scheduling indicator report configuration to each of the multiple UEs; receiving multiple scheduling indicators; and selecting the number N of UEs for participating in local model training according to the multiple scheduling indicators.

In some embodiments, the method may include obtaining the number N and the first channel gain threshold in response to at least one of: a new global model being applied; a global model convergence being achieved; or a convergence speed of a global model being lower than a desired speed.

In some embodiments, obtaining the number N and the first channel gain threshold includes: determining the number N based on the uplink channel state information and a historical number of iterations for convergence of a global model, and determining the first channel gain threshold based on the uplink channel state information.

In some embodiments, the first channel gain threshold is a value of a K-th largest channel gain among channel gains received from the multiple UEs, wherein K is an integer not less than the number N.

In some embodiments, obtaining the number N and the first channel gain threshold includes: transmitting the uplink channel state information to a server; and receiving the first channel gain threshold and the number N from the server.

In some embodiments, the scheduling indicator report configuration transmitted to a UE includes at least one of: a resource for reporting a scheduling indicator calculated by the UE; the first channel gain threshold; or a report quantity indicating a report of the scheduling indicator of the UE.

In some embodiments, the resource for reporting the scheduling indicator calculated by the UE is indicated as a dynamic granted resource or a configured or preconfigured timing relative to a slot or sub-slot where the UE receives the scheduling indicator report configuration.

In some embodiments, the scheduling indicator report configuration is transmitted via one of: RRC signaling; MAC CE; DCI; or artificial intelligence related signaling.

In some embodiments, selecting the number N of UEs for participating in local model training includes selecting the number N of UEs with the smallest scheduling indicator values among the multiple scheduling indicators.

In some embodiments, the method may further include: transmitting a local model report configuration to each of the number N of UEs; and receiving updated local models from the number N of UEs.

In some embodiments, the local model report configuration transmitted to a UE includes at least one of: a resource for reporting an updated local model of the UE; a global model; or a report quantity indicating a report of the updated local model of the UE.

In some embodiments, the resource for reporting the updated local model of the UE is indicated as a dynamic granted resource or a configured or preconfigured timing relative to a slot or sub-slot where the UE receives the local model report configuration.

In some embodiments, the local model report configuration is transmitted via one of: RRC signaling; MAC CE; DCI; or artificial intelligence related signaling.

In some embodiments, the method may further include: updating a global model according to the updated local models; and in the case that convergence of the updated global model is not achieved, transmitting a local model report configuration containing the updated global model to the number of N UEs for further local model training.

In some embodiments, the method may further include: receiving, from a server, a local model report configuration trigger message including at least one of the following: a maximum latency for reporting local models; identifiers (IDs) of the multiple UEs; a report quantity indicating a report of an updated local model; the number N; an interim report quantity indicating a report of a schedule indicator; a global model; or the first channel gain threshold; and transmitting the updated local models which satisfy the maximum latency to the server.

In some embodiments, the method may further include: updating a global model according to the updated local models; and in the case that convergence of the updated global model is not achieved: determining a second threshold for scheduling indicator according to previously received scheduling indicators; transmitting a quantized scheduling indicator report configuration to each of the multiple UEs; receiving multiple quantized scheduling indicators; and re-selecting the number N of UEs for participating in local model training according to the multiple quantized scheduling indicators.

In some embodiments, the quantized scheduling indicator report configuration transmitted to a UE includes at least one of: a resource for reporting a quantized scheduling indicator of the UE; the second threshold; or a report quantity indicating a report of the quantized scheduling indicator of the UE.

In some embodiment, the quantized scheduling indicator report configuration is transmitted via one of: RRC signaling; MAC CE; DCI; or artificial intelligence related signaling.

In some embodiments, the quantized scheduling indicator includes an ACK indicating that a scheduling indicator calculated by the UE is less than the second threshold or a NACK indicating that the scheduling indicator calculated by the UE is larger than or equal to the second threshold.

In some embodiments, the method may further include: receiving a second threshold for scheduling indicator from the server; transmitting a quantized scheduling indicator report configuration to each of the multiple UEs; receiving multiple quantized scheduling indicators; and re-selecting the number N of UEs for participating in local model training according to the multiple quantized scheduling indicators.

According to some embodiments of the present disclosure, a method performed by a UE may include: receiving a scheduling indicator report configuration including at least one of: a first resource for reporting a scheduling indicator calculated by the UE, a first channel gain threshold, or a report quantity indicating a report of the scheduling indicator of the UE; calculating the scheduling indicator based at least in part on the first channel gain threshold; and transmitting the calculated scheduling indicator on the first resource.

In some embodiments, the method may include calculating the scheduling indicator based on at least one of local data, a battery condition and/or computing power, or a channel state of the UE in addition to the first channel gain threshold.

In some embodiments, the first resource for reporting the scheduling indicator calculated by the UE is indicated as a dynamic granted resource or a configured or preconfigured timing relative to a slot or sub-slot where the UE receives the scheduling indicator report configuration.

In some embodiments, the scheduling indicator report configuration is received via one of: RRC signaling; MAC CE; DCI; or artificial intelligence related signaling.

In some embodiments, the method may further include: receiving a local model report configuration including at least one of: a second resource for reporting an updated local model of the UE, a global model, or a report quantity indicating a report of the updated local model of the UE; updating a local model by training based on local data; and transmitting an updated local model on the second resource.

In some embodiments, the second resource is indicated as a dynamic granted resource or a configured or preconfigured timing relative to a slot or sub-slot where the UE receives the local model report configuration.

In some embodiments, the local model report configuration is received via one of: RRC signaling; MAC CE; DCI; or artificial intelligence related signaling.

In some embodiments, the method may further include: receiving a quantized scheduling indicator report configuration including at least one of: a third resource for reporting a quantized scheduling indicator of the UE, a second threshold for scheduling indicator, or a report quantity indicating a report of the quantized scheduling indicator of the UE; calculating a scheduling indicator; and transmitting the quantized scheduling indicator based on a comparison between the calculated scheduling indicator and the second threshold on the third resource.

In some embodiments, the quantized scheduling indicator report configuration is received via one of: RRC signaling; MAC CE; DCI; or artificial intelligence related signaling.

In some embodiments, the quantized scheduling indicator is an ACK in response to that the calculated scheduling indicator is less than the second threshold; or the quantized scheduling indicator is a NACK in response to that the calculated scheduling indicator is larger than or equal to the second threshold.

According to some embodiments of the present disclosure, a method performed by a server may include: receiving uplink channel state information between multiple UEs and a BS; determining a first channel gain threshold and a number N based at least in part on the uplink channel state information, wherein the number N is a number of UEs to participate in local model training; and transmitting a local model report configuration trigger message including at least one of: a report quantity indicating a report of an updated local model, the number N, an interim report quantity indicating a report of a scheduling indicator, the first channel gain threshold, a maximum latency for reporting local models, or a global model.

In some embodiments, the method may include: determining the number N based on the uplink channel state information and a historical number of iterations for convergence of the global model, and determining the first channel gain threshold based on the uplink channel state information.

In some embodiments, the local model report configuration trigger message is transmitted via artificial intelligence related signaling.

In some embodiments, the method may include determining the number N and the first channel gain threshold in response to at least one of: a new global model being applied; a global model convergence being achieved; or a convergence speed of the global model being lower than a desired speed.

In some embodiments, the first channel gain threshold is a value of a K-th largest channel gain among channel gains between the multiple UEs and the BS, wherein K is an integer not less than the number N.

In some embodiments, the method may further include: receiving updated local models of UEs from the BS; updating the global model according to the updated local models; and in the case that convergence of the updated global model is not achieved, transmitting a local model report configuration trigger message containing the updated global model to the BS for further local model training.

In some embodiments, the method may further include: receiving scheduling indicators of UEs from the BS; determining a second threshold for scheduling indicator according to the received scheduling indicators in the case that convergence of the updated global model is not achieved; and transmitting the second threshold to the BS.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only exemplary embodiments of the present disclosure and are not therefore intended to limit the scope of the present disclosure.

DETAILED DESCRIPTION

Figure 1:
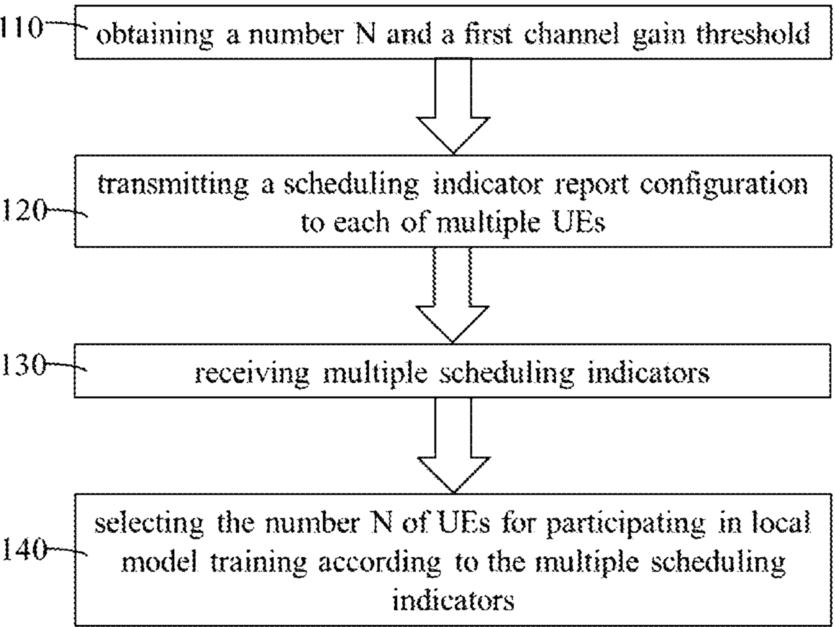
FIG. 1 illustrates a flowchart of an exemplary method according to some embodiments of the present disclosure.

The detailed description of the appended drawings is intended as a description of the currently preferred embodiments of the present invention and is not intended to represent the only form in which the present invention may be practiced. It should be understood that the same or equivalent functions may be accomplished by different embodiments that are intended to be encompassed within the spirit and scope of the present invention.

While operations are depicted in the drawings in a particular order, persons skilled in the art will readily recognize that such operations need not be performed in the particular order shown or in sequential order, or that among all illustrated operations, to achieve desirable results, sometimes one or more operations can be skipped. Further, the drawings can schematically depict one or more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing can be advantageous.

Reference will now be made in detail to some embodiments of the present disclosure, examples of which are illustrated in the accompanying drawings. To facilitate understanding, embodiments are provided under specific network architecture and new service scenarios, such as 3rd generation partnership project (3GPP) long-term evolution (LTE) and LTE Advanced, 3GPP 5G new radio (NR), 5G-Advanced, 6G and so on. It is contemplated that along with the developments of network architectures and new service scenarios, all embodiments in the present disclosure are also applicable to similar technical problems; and moreover, the terminologies recited in the present disclosure may change, which should not affect the principle of the present disclosure.

In some embodiments of the present disclosure, UEs may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UE may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE may include wearable devices, such as smart watches, fitness bands, optical head-mounted displays, or the like. Moreover, the UE may be referred to as a subscriber unit, a mobile, a mobile station, a user, a terminal, a mobile terminal, a wireless terminal, a fixed terminal, a subscriber station, a user terminal, or a device, or described using other terminology used in the art. Moreover, UE(s) may work in a wider Internet-of-Thing (IoT) or Industrial IoT (IIoT) scenario with increased demand(s) of low air-interface latency and/or high reliability to be satisfied, which includes such as factory automation, electrical power distribution, and/or transport industry.

In some embodiments of the present disclosure, a BS may be referred to as an access point, an access terminal, a base, a base unit, a macro cell, a Node-B, an enhanced Node-B, an evolved Node B (eNB), a next generation Node B (gNB), a Home Node-B, a relay node, or a device, or described using other terminology used in the art. The BS is generally part of a radio access network that may include a controller communicably coupled to the BS.

According to some embodiments of the present disclosure, a server for edge computing, e.g., an edge data network (EDN) server or other device with similar functionality, may be integrated into or connected to a BS. One or more global models may be maintained on the server. The server may receive updated local models from UEs (e.g., via the BS) and aggregate all received local models to improve the corresponding global model(s).

There may be a massive number of UEs involved in an FL procedure. A round (also referred to as an iteration) of the FL procedure may include the following three steps:

1. A UE within a set of UEs selected for local model training obtains (or downloads) a current global model (e.g., parameter(s) of the current global model) from the server (e.g., via the BS).
2. The UE obtains an updated local model corresponding to the current global model by training according to their local data and transmits (or uploads) the updated local model (e.g., parameter(s) of the updated local model) to the server (e.g., via the BS)
3. The server aggregates all received local models (e.g., by averaging) to construct an improved global model.

The aforementioned steps will be performed iteratively until achieving convergence of the global model. It can be seen that there are a lot of communications between multiple UEs and the BS for FL training, and the communication can be slower than local computation by many orders of magnitude due to limited resources such as bandwidth and power. In other words, wireless communication between the BS and each of the multiple UEs is a critical bottleneck in terms of delay budget for constructing an FL system.

Besides, data heterogeneity in wireless networks brings more difficulty for system optimization in an FL system. In practical scenarios, users usually have non-independent and identically distributed (non-i.i.d.) local data (e.g., local data of different users may have partial correlation or have different distributions), which means that their local updates will impact the global model to different extents.

Therefore, it is necessary to develop communication-efficient methods that properly determine how many UEs should be selected for local model training and/or which UEs should be involved in each FL training process by taking into account the data heterogeneity of all involved UEs.

FIG. 1 illustrates a flowchart of an exemplary method 100 according to some embodiments of the present disclosure. Although the method 100 is described herein with respect to a BS, it is contemplated that the method 100 can be performed by other device with similar functionality. In some embodiments of the present disclosure, the BS may include or be connected to a server for edge computing (e.g., an EDN server). In some embodiments, the BS may perform the method 100 in response to at least one of the following conditions: (1) when a new global model is applied in an FL system; (2) when a global model convergence is achieved in the FL system; or (3) when some predefined events occur, for example, when a convergence speed (e.g., represented by a number of iterations for convergence) of a global model is lower than a desired speed in the FL system.

In operation 110, the BS may obtain a number N and a first channel gain threshold $h_{th}$, wherein N is the number of UEs that will be selected to participate in local model training. In some embodiments of the present disclosure, N and $h_{th}$ can be determined by the BS itself, for example, when an EDN server is integrated in the BS. In some other embodiments of the present disclosure, N and $h_{th}$ can be determined by a server (e.g., an EDN server) connected to the BS and then transmitted to the BS. According to some embodiments, N and $h_{th}$ are determined based at least in part on uplink channel state information (CSI) between the BS and multiple UEs.

In some embodiments, N is determined according to at least time consumption for one iteration communication and a number of iterations for convergence of a global model. By taking the time consumption for one iteration communication and the number of iterations for convergence into consideration in determining N, the training efficiency and communication efficiency can be improved.

In an embodiment, the time consumption for one iteration communication can be determined based on the uplink CSI received from the multiple UEs, and the number of iterations for convergence can be determined by using the past training experience of this FL system, for example, based on a historical number of iterations for convergence of a global model. Specifically, the relationship between the number of involved UEs and the global convergence time is used to evaluate the convergence rate of a specific number of involved users.

In some embodiments, $h_{th}$ is a value of a K-th largest channel gain among channel gains of the multiple UEs, which can be obtained from the CSI received from the multiple UEs, wherein K is an integer no less than N and can be determined by the BS or the server.

In operation 120, the BS may transmit a scheduling indicator report configuration (e.g., via a SchedulingIndicator-ReportCofig message) to each of the multiple UEs.

In some embodiments, the scheduling indicator report configuration transmitted to a UE may include at least one of:

- a resource for reporting a scheduling indicator calculated by the UE;
- $h_{th}$; or
- a report quantity indicating a report of the scheduling indicator of the UE.

In some embodiments, the resource for reporting the scheduling indicator is indicated to the UE as a dynamic granted resource or a configured or preconfigured timing relative to a slot or sub-slot where the UE receives the scheduling indicator report configuration.

In some embodiments, the scheduling indicator report configuration is transmitted via one of RRC signalling, MAC CE, DCI, or artificial intelligence related signalling.

According to some embodiments of the present disclosure, after receiving the scheduling indicator report configuration, the UE may calculate a scheduling indicator according to at least the received $h_{th}$.

In some embodiments, the UE may calculate the scheduling indicator according to at least one of local data, a battery condition and/or computing power, a channel state, or the received configuration (e.g., $h_{th}$ included in the scheduling indicator report configuration).

In an embodiment, the scheduling indicator (i.e., $S_i$) is calculated according to formula (1):

$$S_i = \frac{D(p \| p_i)}{\mathbb{I}\{h_i > h_{th}\} + \mathbb{I}\{b_i > b_{th}^i\} + \epsilon} \tag{1}$$

Wherein:

- p is a target distribution (e.g., an ideal data distribution in practical scenarios), for example, for a classification task, the target distribution is a uniform distribution for all classified objectives;
- $p_i$ is a UE i's local data distribution;
- $D(p\|p_i)$ is a relative entropy between p and $p_i$;
- $\mathbb{I}\{\cdot\}$ is an indicator function: if the expression within the pair of braces is true, then $\mathbb{I}\{\cdot\}=1$; otherwise, $\mathbb{I}\{\cdot\}=0$;
- $b_i$ is the battery condition and/or computing power of UE i;

$$b_{th}^i$$

is a threshold of battery condition and/or computing power of UE i for finishing the training process; and $\epsilon$ is a small positive value to avoid the zero denominator.

According to formula (1), a smaller relative entropy (i.e., a smaller distance) between UE i's local data distribution and the target distribution, a better channel condition of UE i, and a better battery condition and/or more computing power of UE i results in a smaller value of the scheduling indicator $S_i$. That is to say, the scheduling indicator $S_i$ can be interpreted as the evaluation of the data heterogeneity and system heterogeneity, i.e., the degree of the non-i.i.d. and the influence of the battery condition and channel state of UE i.

After calculating the scheduling indicator, the UE may transmit the calculated scheduling indicator to the BS on the resource indicated by the scheduling indicator report configuration.

In operation 130, the BS may receive multiple scheduling indicators from the multiple UEs.

In operation 140, the BS may select N UEs from the multiple UEs for participating in local model training according to the multiple scheduling indicators.

In practical scenarios, since UEs have different conditions of battery power and network connectivity, typically only a fraction of the multiple UEs is active. The UEs which cannot report scheduling indicator timely, referred to as stragglers, will slow down the whole learning process. According to some embodiments of the present disclosure, the BS does not need to receive scheduling indicators from all of the multiple UEs before selecting the N UEs. The BS may start a pre-defined timer and may stop collecting scheduling indicators from the multiple UEs when the pre-defined timer expires. Alternatively or additionally, the BS may stop collecting scheduling indicators from the multiple UEs when the number of received scheduling indicators reaches a pre-defined threshold (e.g., not less than N). This provides flexibility to avoid the influence of stragglers in the training process, thereby reducing time consumption of the model training.

In some embodiments, in operation 140, the BS may select N UEs from the multiple UEs according to the values of the received scheduling indicators such that the N selected UEs contribute to convergence of the global model to the maximum extent. For example, the BS may select N UEs that have the smallest scheduling indicator values among the multiple scheduling indicators.

According to the method 100, the BS determines the number N and selects N UEs from multiple UEs for FL training. This procedure may decrease the time consumption of communication by reducing the number of involved UEs and improving the convergence rate of the global model.

Furthermore, by selecting the UE according to the value of the scheduling indicator thereof, which is calculated based on at least the battery condition and/or computing power of the UE, the relative entropy between the target distribution and the UE's local data distribution, and other factors, the effect of the data heterogeneity in the FL system will be reduced, so that the communication efficiency is improved.

Figure 2:
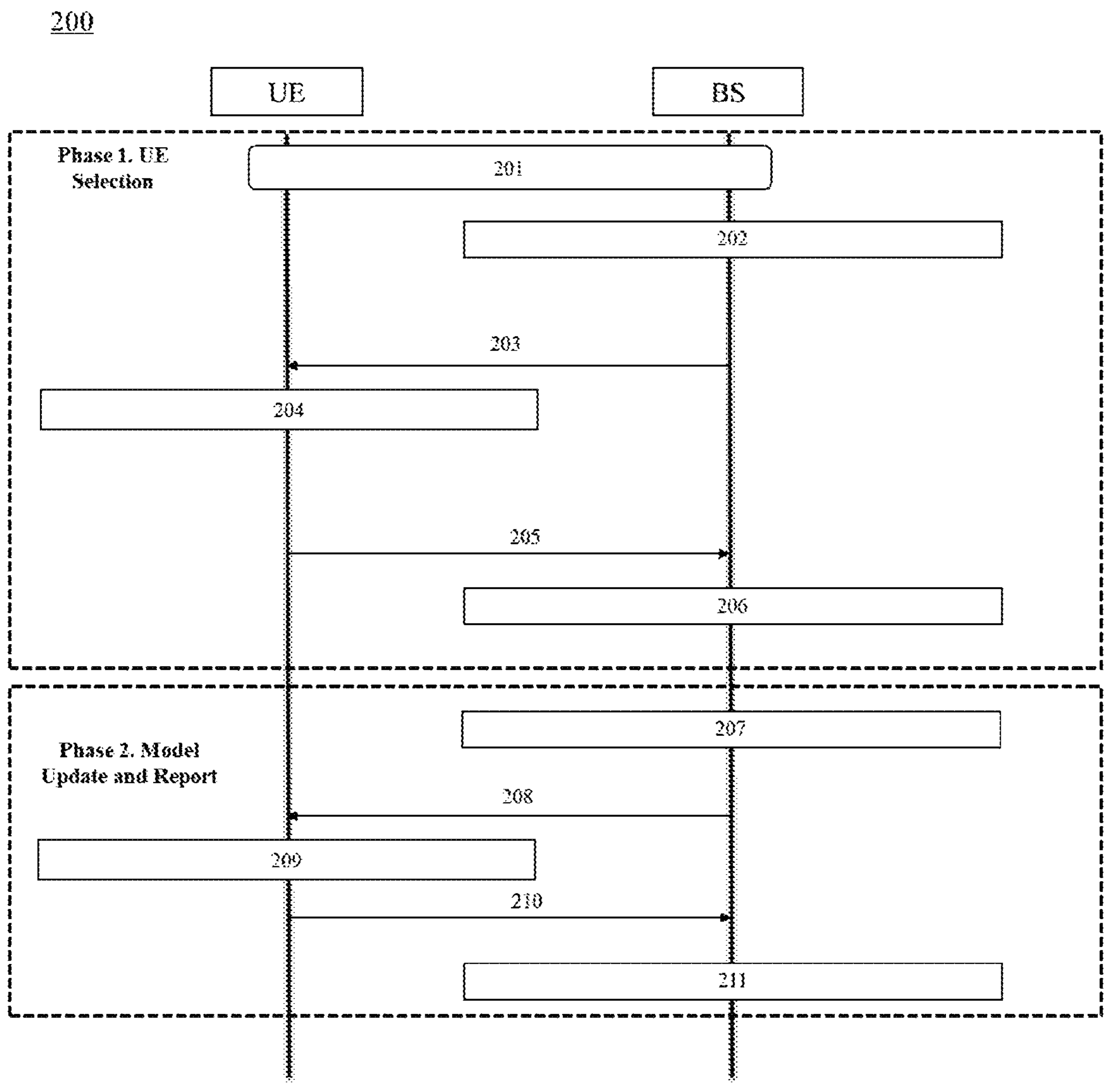
FIG. 2 illustrates a flowchart of an exemplary method according to some embodiments of the present disclosure.

FIG. 2 illustrates a flowchart of an exemplary method 200 according to some embodiments of the present disclosure. Although the method 200 is illustrated in a system level by a UE and a BS, persons skilled in the art can understand that the method implemented in the UE and that implemented in the BS can be separately implemented and incorporated by other apparatus with the like functions. In the example of FIG. 2, a server for edge computing can be integrated into the BS.

As shown in FIG. 2, the method 200 may include two phases: UE selection phase (phase 1) and model update and report phase (phase 2).

Phase 1 includes steps 201-206. As stated above, UE selection may be triggered when a new global model is applied, when a global model convergence is achieved, or when some predefined events occur, e.g., when a convergence speed of a global model is lower than a desired speed.

In step 201, the BS may receive uplink CSI between the BS and the UE via, e.g., an uplink CSI acquisition procedure performed between the UE and the BS. Also, the BS may receive uplink CSI from other UEs.

In step 202, the BS may determine a number N and a first channel gain threshold $h_{th}$ based on at least in part on the uplink CSI received from multiple UEs. For example, the BS may determine N and $h_{th}$ by any means described with respect to operation 110 in FIG. 1.

Then, the BS may allocate resources for the multiple UEs to report their scheduling indicators. In step 203, the BS may transmit a scheduling indicator report configuration to the UE. The scheduling indicator report configuration may include at least one of: the allocated resource for reporting a scheduling indicator calculated by the UE; $h_{th}$; or a report quantity indicating a report of the scheduling indicator of the UE. In some embodiments, the scheduling indicator report configuration contains at least $h_{th}$ and the allocated resource for the UE to report the scheduling indicator. Also, the BS may transmit a scheduling indicator report configuration to each of the other UEs of the multiple UEs.

In step 204, upon reception of the scheduling indicator report configuration, the UE may calculate a scheduling indicator. In some embodiments, the UE may calculate the scheduling indicator according to at least one of local data, a battery condition and/or computing power, a channel state, or $h_{th}$, for example, by using formula (1).

In step 205, the UE may transmit the calculated scheduling indicator to the BS on the resource allocated by the BS, e.g., the resource indicated by the scheduling indicator report configuration transmitted from the BS in step 203. The BS may also receive scheduling indicators from other UEs.

In step 206, the BS may select a set of N UEs for participating in local model training from the multiple UEs according to the received scheduling indicators. For example, the BS may select N UEs by any means described with respect to operation 140 in FIG. 1.

Phase 2 includes steps 207-211. After selecting the N UEs for participating in local model training, in step 207, the BS may allocate resources for the N selected UEs to report updated local models thereof.

It is assumed that the UE shown in FIG. 2 is one of the N selected UEs. In step 208, the BS may transmit a local model report configuration (e.g., via a LocalModel-Report-Config message) to the UE. The BS may also transmit a local model report configuration to each of the other selected UEs.

In some embodiments, the local model report configuration transmitted to the UE may include at least one of:

- a resource for reporting an updated local model of the UE;
- a global model; or
- a report quantity indicating a report of the updated local model of the UE.

In some embodiments, the resource for reporting the updated local model of the UE is indicated as a dynamic granted resource or a configured or preconfigured timing relative to a slot or sub-slot where the UE receives the local model report configuration.

In some embodiments, the local model report configuration is transmitted via one of RRC signaling, MAC CE, DCI, or artificial intelligence related signaling.

In step 209, after receiving the local model report configuration, the UE may perform training based on local data and update the local model accordingly.

In step 210, the UE may report the updated local model on the resource allocated by the BS, e.g., the resource indicated by the local model report configuration transmitted from the BS in step 208. The BS may receive multiple (up to N) updated local models from the selected UEs.

In step 211, the BS may aggregate all the received updated local models and update the global model accordingly. Then, a first iteration (or a first round) is completed.

In practical scenarios, since UEs have different conditions of battery power and network connectivity, typically only a fraction of the UEs is active. The UEs which cannot report scheduling indicator timely, referred to as stragglers, will slow down the whole learning process. Therefore, in some embodiments, the BS does not need to receive the updated local models from all of the N selected UEs before performing aggregation. The BS may start a pre-defined timer and may stop collecting updated local models from the N selected UEs when the pre-defined timer expires. Alternatively or additionally, the BS may stop collecting updated local models from the N selected UEs when the number of received updated local models reaches a pre-defined threshold. This provides flexibility to avoid the influence of stragglers in the training process, thereby reducing time consumption of the model training.

After step 211, the BS may check if convergence of the updated global model is achieved. In the case that the convergence is achieved, the BS may finish the training procedure, or start a new process (e.g., by returning to step 201) to achieve another convergence of the global model or to achieve convergence of another global model. In the case that the convergence of the updated global model is not achieved, phase 2 may be performed again, i.e., a second iteration (or a second round) for model training may be performed. More iterations (rounds) may be performed until convergence of the updated global model is achieved. In some other embodiments of the present disclosure, in the case that the convergence of the updated global model is not achieved after the first iteration, a phase of UE re-selection may be performed, which will be described below with respect to FIG. 4.

Figure 3:
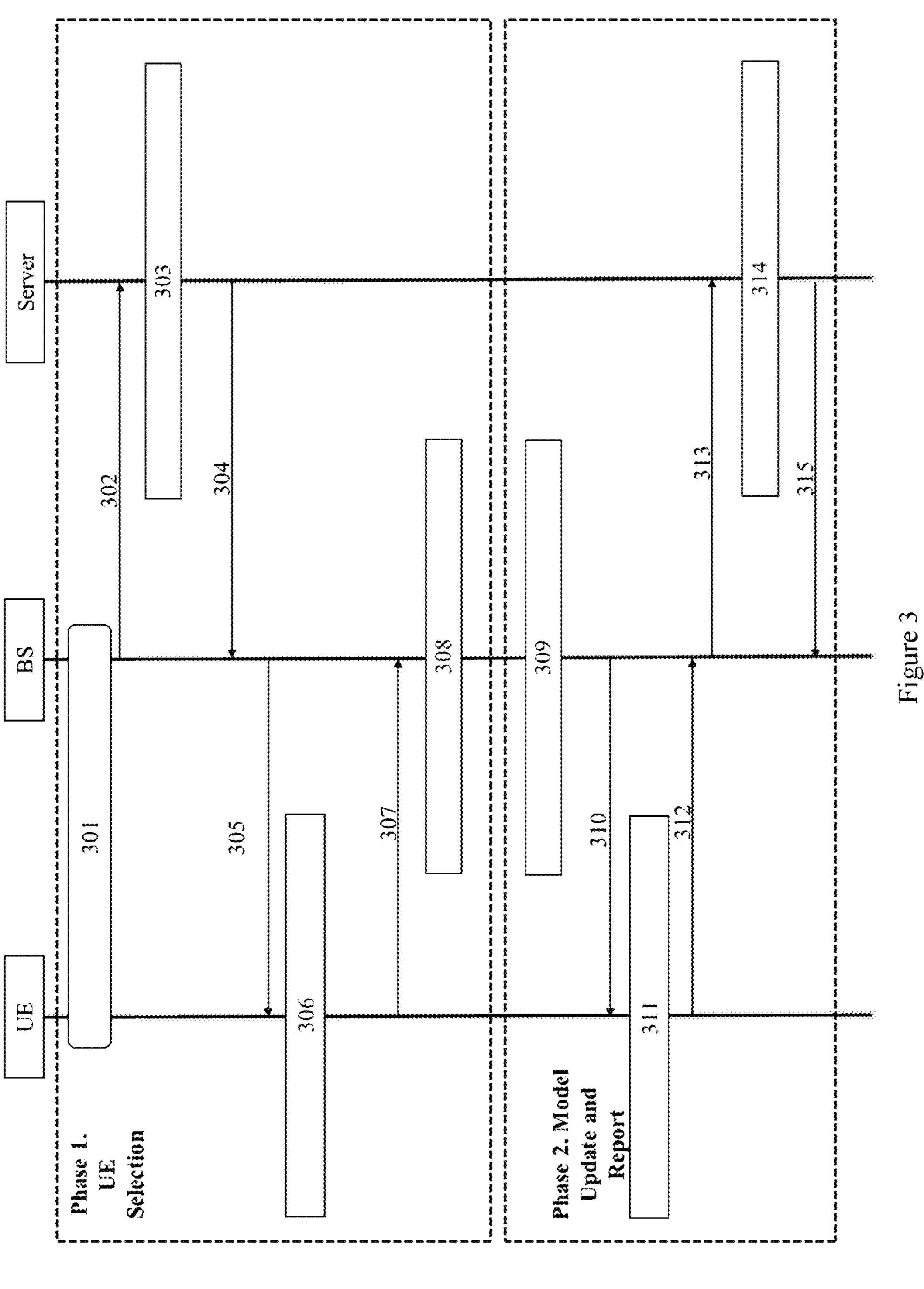
FIG. 3 illustrates a flowchart of an exemplary method according to some embodiments of the present disclosure.

FIG. 3 illustrates a flowchart of an exemplary method 300 according to some embodiments of the present disclosure. Although the method 300 is illustrated in a system level by a UE, a BS, and a server (e.g., an EDN server), persons skilled in the art can understand that the method implemented in the UE, that implemented in the BS, and that implemented in the server can be separately implemented and incorporated by other apparatus with the like functions. In the example of FIG. 3, the server is separated from and connected to the BS.

As shown in FIG. 3, the method 300 may include two phases: UE selection phase (phase 1) and model update and report phase (phase 2).

Phase 1 includes steps 301-308. As stated above, UE selection may be triggered when a new global model is applied, when a global model convergence is achieved, or when some predefined events occur, e.g., when a convergence speed of a global model is lower than a desired speed.

In step 301, the BS may receive uplink CSI between the BS and the UE via, e.g., an uplink CSI acquisition procedure performed between the UE and the BS. Also, the BS may receive uplink CSI from other UEs.

In step 302, the BS may forward the CSI received from multiple UEs to the server.

In step 303, the server may determine a number N and a first channel gain threshold $h_{th}$ based on at least in part on the uplink CSI for the multiple UEs received from the BS. For example, the server may determine N and $h_{th}$ by any means described with respect to operation 110 in FIG. 1.

In step 304, the server may transmit a local model report configuration trigger message (e.g., LocalModel-Report-ConfigTrigger) to the BS, indicating the BS to trigger a scheduling indicator based local model update measurement and reporting among the multiple UEs.

In some embodiments, the local model report configuration trigger message includes at least one of the following information:

- N;
- a report quantity indicating a report of an updated local model;
- an interim report quantity indicating a report of a scheduling indicator;
- $h_{th}$;
- IDs of all the multiple UEs involved in the FL procedure;
- a maximum latency for reporting local models; or
- a global model.

In some embodiments, the local model report configuration trigger message can be carried by a signaling between the server and the BS, or by an intelligent related signaling.

Then, the BS may allocate resources for the multiple UEs to report their scheduling indicators. In step 305, the BS may transmit a scheduling indicator report configuration to the UE. The scheduling indicator report configuration may include at least one of: the allocated resource for reporting a scheduling indicator calculated by the UE; $h_{th}$; or a report quantity indicating a report of the scheduling indicator of the UE. In some embodiments, the scheduling indicator report configuration contains at least $h_{th}$ and the allocated resource for the UE to report the scheduling indicator. Also, the BS may transmit a scheduling indicator report configuration to each of the other UEs of the multiple UEs.

In step 306, upon reception of a scheduling indicator report configuration, the UE may calculate a scheduling indicator. In some embodiments, the UE may calculate the scheduling indicator according to at least one of local data, a battery condition and/or computing power, a channel state, or $h_{th}$, for example, by using formula (1).

In step 307, the UE may transmit the calculated scheduling indicator to the BS on the resource allocated by the BS, e.g., the resource indicated by the scheduling indicator report configuration transmitted from the BS in step 305. The BS may also receive scheduling indicators from other UEs.

In step 308, the BS may select a set of N UEs for participating in local model training from the multiple UEs according to the received scheduling indicators. For example, the BS may select N UEs by any means described with respect to operation 140 in FIG. 1.

Phase 2 includes steps 309-315. After selecting the N UEs for participating in local model training, in step 309, the BS may allocate resources for the N selected UEs to report updated local models thereof.

It is assumed that the UE shown in FIG. 3 is one of the N selected UEs. In step 310, the BS may transmit a local model report configuration (e.g., via a LocalModel-Report-Config message) to the UE. The BS may also transmit a local model report configuration to each of the other selected UEs.

In some embodiments, the local model report configuration transmitted to the UE may include at least one of:

- a resource for reporting an updated local model of the UE;
- a global model; or
- a report quantity indicating a report of the updated local model of the UE.

In some embodiments, the resource for reporting the updated local model of the UE is indicated as a dynamic granted resource or a configured or preconfigured timing relative to a slot or sub-slot where the UE receives the local model report configuration.

In some embodiments, the local model report configuration is transmitted via one of RRC signaling, MAC CE, DCI, or artificial intelligence related signaling.

In step 311, after receiving the local model report configuration, the UE may perform training based on local data and update the local model accordingly.

In step 312, the UE may report the updated local model on the resources allocated by the BS, e.g., the resource indicated by the local model report configuration transmitted from the BS in step 310. The BS may receive multiple (up to N) updated local models from the selected UEs.

In step 313, the BS may report to the server all the received updated local models. In addition, in some embodiments, the BS may report all the scheduling indicators received in step 307 to the server for any possible further process in step 313. The time duration between the BS receiving a local model report configuration trigger message from the server in step 304 and the server receiving all updated local models from the BS in step 313 should satisfy a maximum latency, e.g., the maximum latency indicated by the local model report configuration trigger message transmitted from the server in step 304.

In step 314, the server may aggregate all the received updated local models and update the global model accordingly. Then, a first iteration (or a first round) is completed.

After step 314, the server may determine if convergence of the updated global model is achieved. In the case that the convergence is achieved, the server may finish the training procedure, or start a new process (e.g., by returning to step 301) to achieve another convergence of the global model or to achieve convergence of another global model. In the case that the convergence of the updated global model is not achieved, in step 315, the server may transmit a local model report configuration trigger message containing the updated global model to the BS, indicating to perform phase 2 again, i.e., to perform a second iteration (or a second round) for model training. More iterations (rounds) may be performed until convergence of the updated global model is achieved. In some other embodiments of the present disclosure, in the case that the convergence of the updated global model is not achieved after the first iteration, a phase of UE re-selection may be performed, which will be described below with respect to FIG. 5.

Figure 4:
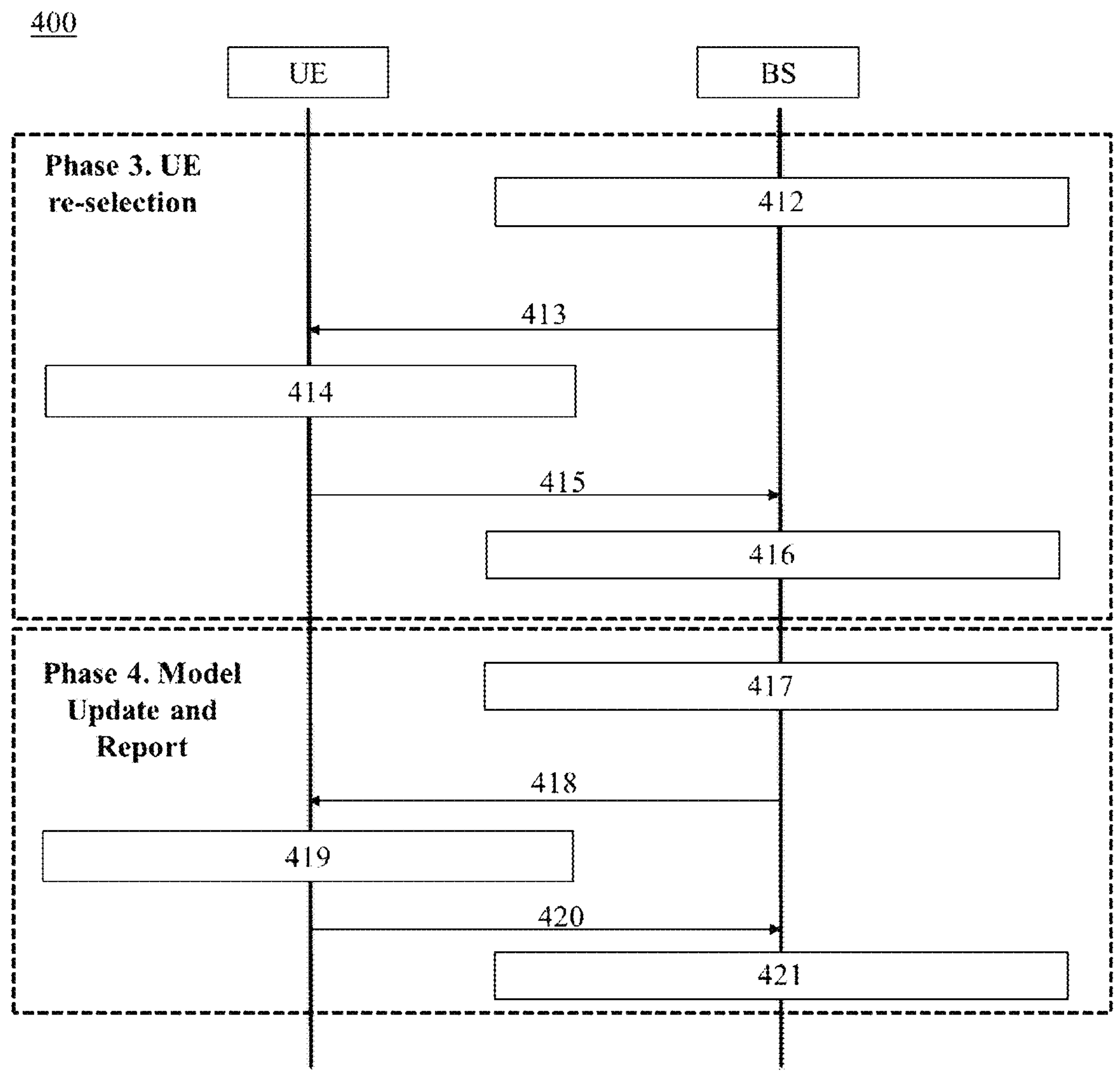
FIG. 4 illustrates a flowchart of an exemplary method according to some embodiments of the present disclosure.

FIG. 4 illustrates a flowchart of an exemplary method 400 according to some embodiments of the present disclosure. Although the method 400 is illustrated in a system level by a UE and a BS, persons skilled in the art can understand that the method implemented in the UE and that implemented in the BS can be separately implemented and incorporated by other apparatus with the like functions. In the example of FIG. 4, a server for edge computing can be integrated into the BS.

The method 400 can be performed when convergence of the updated global model is not achieved after a first iteration (or a first round) for model training, for example, after step 211 illustrated in FIG. 2. However, the UE shown in FIG. 4 may not be the same UE as that shown in FIG. 2.

As shown in FIG. 4, the method 400 may include two phases: UE re-selection (phase 3) and model update and report phase (phase 4).

Phase 3 includes steps 412-416. In step 412, the BS may determine a second threshold $SI_{th}$ for scheduling indicator according to the past training experience of this FL system. For example, the BS may determine $SI_{th}$ according to previously received scheduling indicators (e.g., scheduling indicators received in phase 1 shown in FIG. 2). In an embodiment, the BS may determine $SI_{th}$ as the Nth smallest scheduling indicator received in the previous UE (re-) selection phase.

Then, the BS may allocate resources for all the multiple UEs involved in the FL procedure to report their quantized scheduling indicators. In step 413, the BS may transmit a quantized scheduling indicator report configuration (e.g., via a QuantizedSchedulingIndicator-ReportCofig message) to the UE. The quantized scheduling indicator report configuration may include at least one of:

A report quantity indicating a report of a quantized scheduling indicator of the UE;

$SI_{th}$; or the allocated resource for reporting the quantized scheduling indicator.

Also, the BS may transmit a quantized scheduling indicator report configuration to each of the other UEs of the multiple UEs.

In some embodiments, the resource for reporting the quantized scheduling indicator is indicated to the UE as a dynamic granted resource or a configured or preconfigured timing relative to a slot or sub-slot where the UE receives the scheduling indicator report configuration.

In some embodiments, the quantized scheduling indicator report configuration is transmitted via one of RRC signalling, MAC CE, DCI, or artificial intelligence related signalling.

In step 414, upon reception of the quantized scheduling indicator report configuration, the UE may calculate a scheduling indicator. In some embodiments, the UE may calculate the scheduling indicator according to at least one of local data, a battery condition and/or computing power, a channel state, or $h_{th}$, for example, by using formula (1). The UE may then compare the calculated scheduling indicator with $SI_{th}$. In step 415, the UE may report a quantized scheduling indicator based on the comparison to the BS on the resource allocated by the BS, e.g., the resource indicated by the quantized scheduling indicator report configuration transmitted from the BS in step 413. The BS may also receive quantized scheduling indicators from other UEs.

In some embodiments, when the calculated scheduling indicator is less than $SI_{th}$, the quantized scheduling indicator reported by the UE is an ACK; otherwise, the quantized scheduling indicator is a NACK. In some other embodiments, the UE may send no feedback to the BS when the calculated scheduling indicator is not less than $SI_{th}$.

In step 416, the BS may re-select a set of N UEs for further local model training according to the received quantized scheduling indicators, wherein N is determined by the BS in a previous UE selection phase, e.g., in step 202 as shown in FIG. 2.

In some embodiments, the BS may randomly select N UEs with a feedback of ACK corresponding to the quantized scheduling indicator. In other words, the BS may randomly select N UEs from the UEs having a scheduling indicator less than $SI_{th}$. In some embodiments, the BS may select N UEs with earliest received feedback of ACK.

Phase 4 includes steps 417-421. The steps 417-421 are nearly the same as steps 207-211 illustrated in FIG. 2.

After re-selecting the N UEs for participating in local model training, in step 417, the BS may allocate resources for the N re-selected UEs to report updated local models thereof.

It is assumed that the UE shown in FIG. 4 is one of the N re-selected UEs. In step 418, the BS may transmit a local model report configuration (e.g., via a LocalModel-Report-Config message) to the UE. The BS may also transmit a local model report configuration to each of the other re-selected UEs.

In some embodiments, the local model report configuration transmitted to the UE may include at least one of:

a resource for reporting an updated local model of the UE;

a global model; or a report quantity indicating a report of the updated local model of the UE.

In some embodiments, the resource for reporting the updated local model of the UE is indicated as a dynamic granted resource or a configured or preconfigured timing relative to a slot or sub-slot where the UE receives the local model report configuration.

In some embodiments, the local model report configuration is transmitted via one of RRC signaling, MAC CE, DCI, or artificial intelligence related signaling.

In step 419, after receiving the local model report configuration, the UE may perform training based on local data and update the local model accordingly.

In step 420, the UE may report the updated local model on the resources indicated by the BS, e.g., the resource indicated by the local model report configuration transmitted from the BS in step 418. The BS may receive multiple (up to N) updated local models from the re-selected UEs.

In step 421, the BS may aggregate all the received updated local models and updates the global model accordingly. Similarly, in some embodiments, the BS does not need to receive the updated local models from all of the N re-selected UEs before performing aggregation.

After step 421, the BS may check if convergence of the updated global model is achieved. In the case that the convergence is achieved, the BS may finish the training procedure, or start a new process to achieve another convergence of the global model or to achieve convergence of another global model. In the case that the convergence of the updated global model is not achieved, phase 3 and phase 4 may be performed again. More iterations (rounds) may be performed until convergence of the updated global model is achieved.

Figure 5:
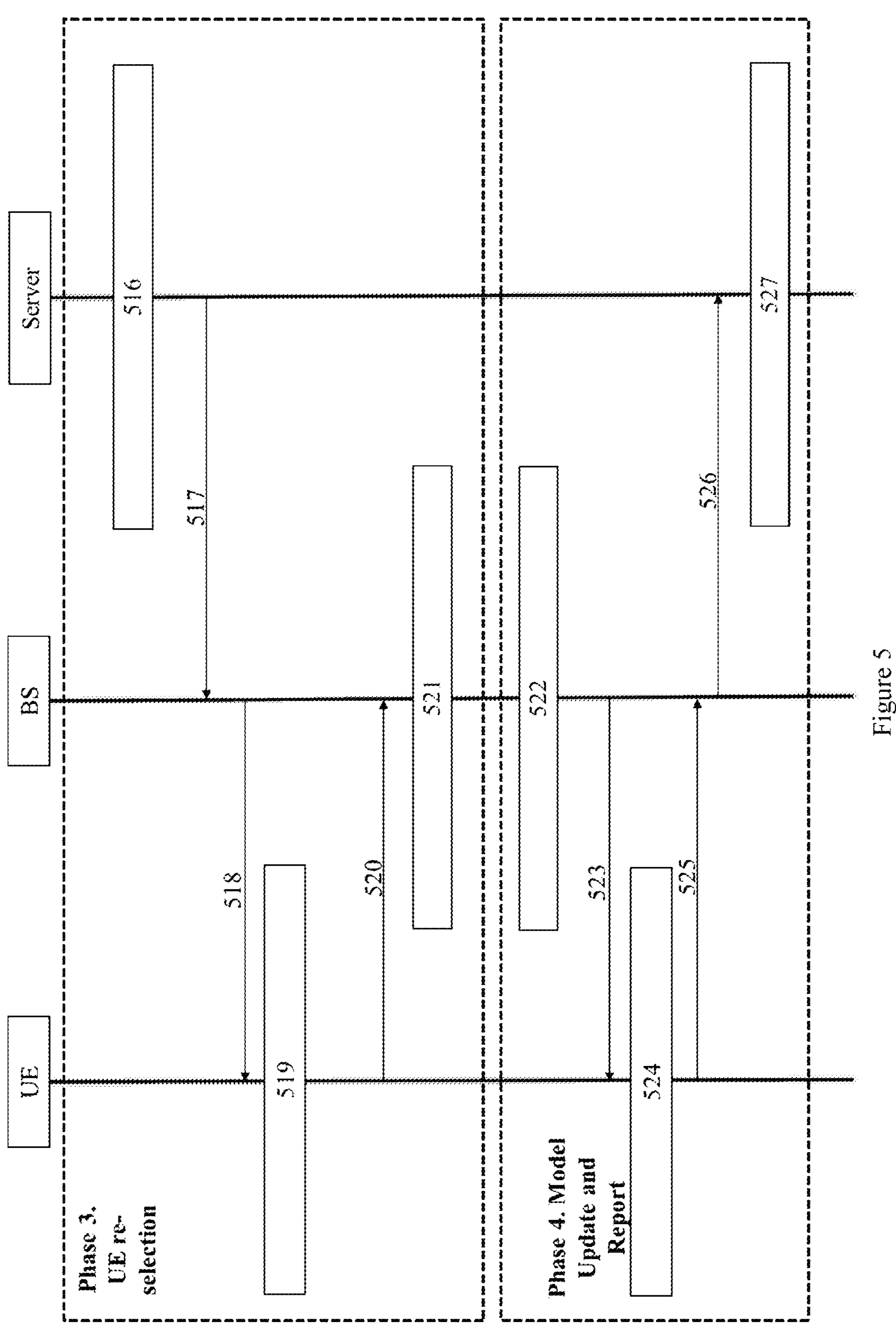
FIG. 5 illustrates a flowchart of an exemplary method according to some embodiments of the present disclosure.

FIG. 5 illustrates a flowchart of an exemplary method 500 according to some embodiments of the present disclosure. Although the method 500 is illustrated in a system level by a UE, a BS, and a server (e.g., an EDN server), persons skilled in the art can understand that the method implemented in the UE, that implemented in the BS, and that implemented in the server can be separately implemented and incorporated by other apparatus with the like functions. In this example, the BS is separated from and is connected to the server.

The method 500 can be performed when convergence of the updated global model is not achieved after a first iteration (or a first round) for model training, for example, after step 314 illustrated in FIG. 3. However, the UE shown in FIG. 5 may not be the same UE as that shown in FIG. 3.

As shown in FIG. 5, the method 500 may include two phases: UE re-selection (phase 3) and model update and report phase (phase 4).

Phase 3 includes steps 516-521. In step 516, the server may determine a second threshold $SI_{th}$ for scheduling indicator according to the past training experience of this FL system. For example, the server may determine $SI_{th}$ according to previously received scheduling indicators (e.g., scheduling indicators received in phase 1 shown in FIG. 3). In an embodiment, the BS may determine $SI_{th}$ as the Nth smallest scheduling indicator received in the previous UE (re-) selection phase.

In step 517, the server may transmit a local model report configuration trigger message (e.g., LocalModel-Report-ConfigTrigger) containing at least $SI_{th}$ to the BS, indicating the BS to trigger a scheduling indicator based local model update measurement and reporting among multiple UEs.

Then, the BS may allocate resources for all the multiple UEs involved in the FL procedure to report their quantized scheduling indicators. In step 518, the BS may transmit a quantized scheduling indicator report configuration (e.g., via a QuantizedSchedulingIndicator-ReportCofig message) to the UE. The quantized scheduling indicator report configuration may include at least one of:

- A report quantity indicating a report of a quantized scheduling indicator of the UE;
- $SI_{th}$; or
- the allocated resource for reporting the quantized scheduling indicator.

Also, the BS may transmit a quantized scheduling indicator report configuration to each of the other UEs of the multiple UEs.

In some embodiments, the resource for reporting the quantized scheduling indicator is indicated to the UE as a dynamic granted resource or a configured or preconfigured timing relative to a slot or sub-slot where the UE receives the scheduling indicator report configuration.

In some embodiments, the quantized scheduling indicator report configuration is transmitted via one of RRC signalling, MAC CE, DCI, or artificial intelligence related signalling.

In step 519, upon reception of the quantized scheduling indicator report configuration, the UE calculate a scheduling indicator. In some embodiments, the UE may calculate the scheduling indicator according to at least one of local data, a battery condition and/or computing power, a channel state, or $h_{th}$, for example, by using formula (1). The UE may then compare the calculated scheduling indicator with $SI_{th}$. In step 520, the UE may report a quantized scheduling indicator based on the comparison to the BS on the resource allocated by the BS, e.g., the resource indicated by the quantized scheduling indicator report configuration transmitted from the BS in step 518. The BS may also receive quantized scheduling indicators from other UEs.

In some embodiments, when the calculated scheduling indicator is less than $SI_{th}$, the quantized scheduling indicator reported by the UE is an ACK; otherwise, the quantized scheduling indicator is a NACK. In some other embodiments, the UE may send no feedback to the BS when the calculated scheduling indicator is not less than $SI_{th}$.

In step 521, the BS may re-select a set of N UEs for further local model training according to the received multiple quantized scheduling indicators, wherein N is received from the server in a previous UE selection phase, e.g., in step 304 as shown in FIG. 3.

In some embodiments, the BS may randomly select N UEs with a feedback of ACK corresponding to the quantized scheduling indicator. In other words, the BS may randomly select N UEs from the UEs having a scheduling indicator less than $SI_{th}$. In some embodiments, the BS may select N UEs with earliest received feedback of ACK.

Phase 4 includes steps 522-527. The steps 522-527 are nearly the same as steps 309-314 illustrated in FIG. 3.

After re-selecting the N UEs for participating in local model training, in step 522, the BS may allocate resources for the N re-selected UEs to report updated local models thereof.

It is assumed that the UE shown in FIG. 5 is one of the N re-selected UEs. In step 523, the BS may transmit a local model report configuration (e.g., via a LocalModel-Report-Config message) to the UE. The BS may also transmit a local model report configuration to each of the other re-selected UEs.

In some embodiments, the local model report configuration transmitted to the UE may include at least one of:

- a resource for reporting an updated local model of the UE;
- a global model; or
- a report quantity indicating a report of the updated local model of the UE.

In some embodiments, the resource for reporting the updated local model of the UE is indicated as a dynamic granted resource or a configured or preconfigured timing relative to a slot or sub-slot where the UE receives the local model report configuration.

In some embodiments, the local model report configuration is transmitted via one of RRC signaling, MAC CE, DCI, or artificial intelligence related signaling.

In step 524, after receiving the local model report configuration, the UE may perform training based on local data and update the local model accordingly.

In step 525, the UE may report the updated local model on the resources indicated by the BS, e.g., the resource indicated by the local model report configuration transmitted from the BS in step 523. The BS may receive multiple (up to N) updated local models from the re-selected UEs.

In step 526, the BS may report to the server all the received updated local models. In addition, in some embodiments, the BS may report all the scheduling indicators received in step 307 to the server for any possible further process in step 526. The time duration between the BS receiving a local model report configuration trigger message from the server in step 517 and the server receiving all updated local models from the BS in step 526 should satisfy a maximum latency, e.g., the maximum latency indicated by the local model report configuration trigger message transmitted from the server in step 304 as illustrated in FIG. 3.

In step 527, the server may aggregate all the received updated local models and updates the global model accordingly.

After step 527, the server may determine if convergence of the updated global model is achieved. In the case that the convergence is achieved, the server may finish the training procedure, or start a new process to achieve another convergence of the global model or to achieve convergence of another global model. In the case that the convergence of the updated global model is not achieved, phase 3 and phase 4 may be performed again. More iterations (rounds) may be performed until convergence of the updated global model is achieved.

It would be appreciated that the present disclosure is not limited to the examples illustrated in FIGS. 1-5. Additional steps not shown may be included. For example, in each iteration after the first iteration, the multiple UEs may report their scheduling indicators to the BS, and the BS may forward the scheduling indicators to the server in the case that the server is separated from the BS and connected to the BS.

Figure 6:
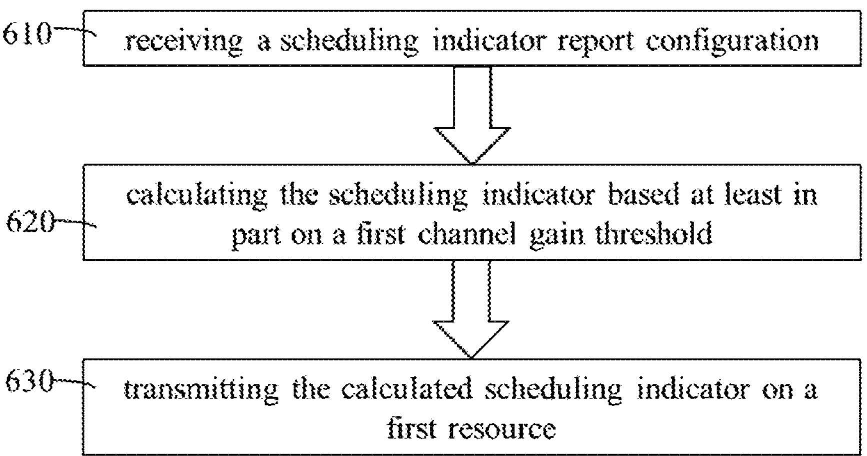
FIG. 6 illustrates a flowchart of an exemplary method according to some embodiments of the present disclosure.

FIG. 6 illustrates a flowchart of an exemplary method 600 according to some embodiments of the present disclosure. Although the method 600 is described herein with respect to a UE, it is contemplated that the method 600 can be performed by other devices with similar functionality.

In operation 610, the UE may receive a scheduling indicator report configuration including at least one of: a first resource for reporting a scheduling indicator calculated by the UE, a first channel gain threshold, or a report quantity indicating a report of the scheduling indicator of the UE.

In some embodiments, the first resource for reporting the scheduling indicator calculated by the UE is indicated as a dynamic granted resource or a configured or preconfigured timing relative to a slot or sub-slot where the UE receives the scheduling indicator report configuration.

In some embodiments, the scheduling indicator report configuration is received via one of the following signaling: RRC signaling, MAC CE, DCI, or artificial intelligence related signaling.

In operation 620, the UE may calculate the scheduling indicator based at least in part on the first channel gain threshold.

In some embodiments, the UE may calculate the scheduling indicator based on at least one of local data, a battery condition and/or computing power, or a channel state of the UE in addition to the first channel gain threshold.

In some embodiments, the UE may calculate the scheduling indicator according to formula (1).

In operation 630, the UE may transmit the calculated scheduling indicator on the first resource.

In some embodiments, method 600 may further include receiving a local model report configuration including at least one of: a second resource for reporting an updated local model of the UE, a global model, or a report quantity indicating a report of the updated local model of the UE; updating a local model by training based on local data; and transmitting an updated local model on the second resource.

In some embodiments, the second resource is indicated as a dynamic granted resource or a configured or preconfigured timing relative to a slot or sub-slot where the UE receives the local model report configuration.

In some embodiments, the local model report configuration is received via one of the following signaling: RRC signaling, MAC CE, DCI, or artificial intelligence related signaling.

In some embodiments, method 600 may further include: receiving a quantized scheduling indicator report configuration including at least one of: a third resource for reporting a quantized scheduling indicator of the UE, a second threshold for scheduling indicator, or a report quantity indicating a report of the quantized scheduling indicator of the UE; calculating a scheduling indicator; and transmitting the quantized scheduling indicator based on a comparison between the calculated scheduling indicator and the second threshold on the third resource.

In some embodiments, the quantized scheduling indicator is an ACK in response to that the calculated scheduling indicator is less than the second threshold; or the quantized scheduling indicator is a NACK in response to that the calculated scheduling indicator is larger than or equal to the second threshold.

Figure 7:
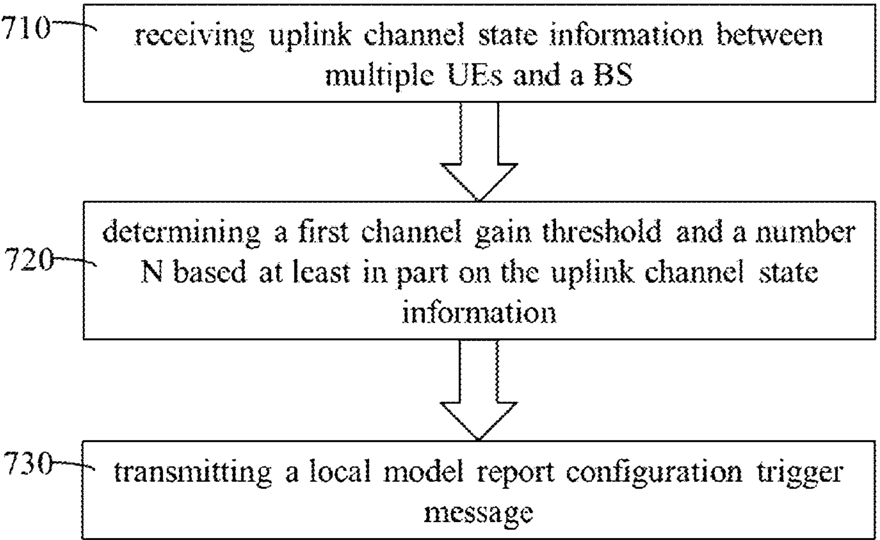
FIG. 7 illustrates a flowchart of an exemplary method according to some embodiments of the present disclosure.

FIG. 7 illustrates a flowchart of an exemplary method 700 according to some embodiments of the present disclosure. Although the method 700 is described herein with respect to a server, it is contemplated that the method 700 can be performed by other devices with similar functionality.

In operation 710, the server may receive uplink channel state information between multiple UEs and a BS.

In operation 720, the server may determine a first channel gain threshold and a number N based at least in part on the uplink channel state information, wherein the number N is a number of UEs to participate in local model training.

In some embodiments, the server may determine the number N based on the uplink channel state information and a historical number of iterations for convergence of a global model, and determine the first channel gain threshold based on the uplink channel state information.

In some embodiments, operation 720 is performed in response to at least one of: a new global model being applied, a global model convergence being achieved, or a convergence speed of the global model being lower than a desired speed.

In some embodiments, the first channel gain threshold is a value of a K-th largest channel gain among channel gains between the multiple UEs and the BS, wherein K is an integer no less than the number N.

In some embodiments, the local model report configuration trigger message is transmitted via artificial intelligence related signaling.

In operation 730, the server may transmit a local model report configuration trigger message including at least one of: a report quantity indicating a report of an updated local model, the number N, an interim report quantity indicating a report of a scheduling indicator, the first channel gain threshold, a maximum latency for reporting local models, or a global model.

In some embodiments, method 700 may further include receiving updated local models of UEs from the BS and updating the global model according to the updated local models. In the case that convergence of the updated global model is not achieved, method 700 may further include transmitting a local model report configuration trigger message containing the updated global model to the BS for further local model training.

In some embodiments, method 700 may further include receiving scheduling indicators of UEs from the BS, determining a second threshold for scheduling indicator according to the received scheduling indicators in the case that convergence of the updated global model is not achieved, and transmitting the second threshold to the BS.

The present disclosure provides various methods for FL training, local model update, or global model aggregation.

According to some embodiments of the present disclosure, a relative entropy, rather than a global optimal value and assumptions on the local loss functions and gradient information, is used for evaluating a non-i.i.d. degree of UEs' local dataset. This makes the local model training suitable for more scenarios.

Furthermore, according to some embodiments of the present disclosure, a relative entropy is used as an indicator of a non-i.i.d. degree of UEs' local dataset, and the calculation of the relative entropy can be conducted on UEs without local information sharing and privacy disclosure.

Moreover, according to some embodiments of the present disclosure, communication performance between a UE and a BS is taken into consideration. It helps to save the time of the local model training and improve the training efficiency.

Besides, according to some embodiments of the present disclosure, the past training experience is used to characterize the relationship between the number of involved UEs and the convergence time, and the battery condition and available computing power of local devices are taken into consideration.

Figure 8:
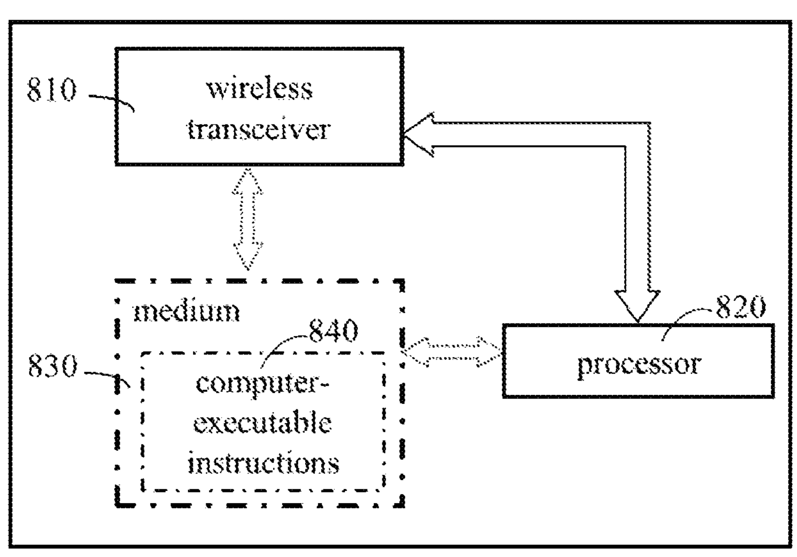
FIG. 8 illustrates a simplified block diagram of an exemplary apparatus according to some embodiments of the present disclosure.

FIG. 8 illustrates a simplified block diagram of an exemplary apparatus 800 according to various embodiments of the present disclosure.

In some embodiments, apparatus 800 may be or include at least a part of a BS or similar device having similar functionality.

In some embodiments, apparatus 800 may be or include at least a part of a UE or similar device having similar functionality.

In some embodiments, apparatus 800 may be or include at least a part of a server (e.g., an EDN server) or similar device having similar functionality.

As shown in FIG. 8, apparatus 800 may include at least wireless transceiver 810 and processor 820, wherein wireless transceiver 810 may be coupled to processor 820. Furthermore, apparatus 800 may include non-transitory computer-readable medium 830 with computer-executable instructions 840 stored thereon, wherein non-transitory computer-readable medium 830 may be coupled to processor 820, and computer-executable instructions 840 may be configured to be executable by processor 820. In some embodiments, wireless transceiver 810, non-transitory computer-readable medium 830, and processor 820 may be coupled to each other via one or more local buses.

Although in FIG. 8, elements such as wireless transceiver 810, non-transitory computer-readable medium 830, and processor 820 are described in the singular, the plural is contemplated unless limitation to the singular is explicitly stated. In certain embodiments of the present disclosure, the apparatus 800 may further include other components for actual usage.

In some embodiments, the apparatus 800 is a BS or at least a part of a BS. Processor 820 is configured to cause the apparatus 800 at least to perform, with wireless transceiver 810, any method described above which is performed by a BS according to the present disclosure.

In some embodiments, processor 820 is configured to obtain a number N and a first channel gain threshold, wherein the number N and the first channel gain threshold are determined based at least in part on uplink channel state information between the BS and multiple UEs. Processor 820 is further configured to: transmit, with wireless transceiver 810, a scheduling indicator report configuration to each of the multiple UEs; receive, with wireless transceiver 810, multiple scheduling indicators; and select the number N of UEs for participating in local model training according to the multiple scheduling indicators.

In some embodiments, processor 820 is configured to determine the number N and the first channel gain threshold in response to at least one of: a new global model being applied; a global model convergence being achieved; or a convergence speed of a global model being lower than a desired speed.

In some embodiments, to obtain the number N and the first channel gain threshold, processor 820 is configured to determine the number N based on the uplink channel state information and a historical number of iterations for convergence of a global model, and to determine the first channel gain threshold based on the uplink channel state information.

In some embodiments, the first channel gain threshold is a value of a K-th largest channel gain among channel gains received from the multiple UEs, wherein K is an integer not less than the number N.

In some embodiments, to obtain the number N and the first channel gain threshold, the processor is configured to: transmit, with wireless transceiver 810, the uplink channel state information to a server; and receive, with wireless transceiver 810, the first channel gain threshold and the number N from the server.

In some embodiments, the scheduling indicator report configuration transmitted to a UE includes at least one of: a resource for reporting a scheduling indicator calculated by the UE; the first channel gain threshold; or a report quantity indicating a report of the scheduling indicator of the UE.

In some embodiments, the resource for reporting the scheduling indicator calculated by the UE is indicated as a dynamic granted resource or a configured or preconfigured timing relative to a slot or sub-slot where the UE receives the scheduling indicator report configuration.

In some embodiments, to select the number N of UEs for participating in local model training, processor 820 is configured to select the number N of UEs with the smallest scheduling indicator values among the multiple scheduling indicators.

In some embodiments, processor 820 is further configured to: transmit, with wireless transceiver 810, a local model report configuration to each of the number N of UEs; and receive, with wireless transceiver 810, updated local models from the number N of UEs In some embodiments, the local model report configuration transmitted to a UE includes at least one of: a resource for reporting an updated local model of the UE; a global model; or a report quantity indicating a report of the updated local model of the UE.

In some embodiments, the resource for reporting the updated local model of the UE is indicated as a dynamic granted resource or a configured or preconfigured timing relative to a slot or sub-slot where the UE receives the local model report configuration.

In some embodiments, the local model report configuration is transmitted via via one of the following signaling: RRC signaling; MAC CE; DCI; or artificial intelligence related signaling.

In some embodiments, processor 820 is further configured to: update a global model according to the updated local models; and in the case that convergence of the updated global model is not achieved: transmit, with wireless transceiver 810, a local model report configuration containing the updated global model to the number of N UEs for further local model training.

In some embodiment, processor 820 is further configured to: receive, with wireless transceiver 810 and from a server, a local model report configuration trigger including at least one of the following: a maximum latency for reporting local models; IDs of the number N of UEs; report quantity indicating updated local models of the number N of UEs; the number N; interim report quantity indicating schedule indicators of the multiple UEs; or the first channel gain threshold; and transmit, with the wireless transceiver, the updated local models which satisfy the maximum latency to the server.

In some embodiments, processor 820 is further configured to: update a global model according to the updated local models; and in the case that convergence of the updated global model is not achieved: determine a second threshold for scheduling indicator according to previously received scheduling indicators; transmit, with wireless transceiver 810, a quantized scheduling indicator report configuration to each of the multiple UEs; receive, with wireless transceiver 810, multiple quantized scheduling indicators; and re-select the number N of UEs for participating in local model training according to the multiple quantized scheduling indicators.

In some embodiments, the quantized scheduling indicator report configuration transmitted to a UE includes at least one of: a resource for reporting a quantized scheduling indicator of the UE; the second threshold; or a report quantity of the quantized scheduling indicator of the UE.

In some embodiments, the quantized scheduling indicator includes an ACK indicating that a scheduling indicator calculated by the UE is less than the second threshold or a NACK indicating that the scheduling indicator calculated by the UE is larger than or equal to the second threshold.

In some embodiments, processor 820 is further configured to receive, with wireless transceiver 810, a second threshold for scheduling indicator from the server; transmit, with wireless transceiver 810, a quantized scheduling indicator report configuration to each of the multiple UEs; receive, with wireless transceiver 810, multiple quantized scheduling indicators; and re-select the number N of UEs for participating in local model training according to the multiple quantized scheduling indicators.

In some embodiments, the apparatus 800 is a UE. In some embodiments, the processor 820 is configured to: receive, with wireless transceiver 810, a scheduling indicator report configuration including at least one of: a first resource for reporting a scheduling indicator calculated by the UE, a first channel gain threshold, or a report quantity of the scheduling indicator of the UE; calculate the scheduling indicator based at least in part on the first channel gain threshold; and transmit, with wireless transceiver 810, the calculated scheduling indicator on the first resource.

In some embodiments, processor 820 is configured to calculate the scheduling indicator based on at least one of local data, a battery condition and/or computing power, or a channel state of the UE in addition to the first channel gain threshold.

In some embodiments, the first resource for reporting the scheduling indicator calculated by the UE is indicated as a dynamic granted resource or a configured or preconfigured timing relative to a slot or sub-slot where the UE receives the scheduling indicator report configuration.

In some embodiments, the scheduling indicator report configuration is received via one of the following signaling: RRC signaling; MAC CE; DCI; or artificial intelligence related signaling.

In some embodiments, processor is further configured to: receive, with wireless transceiver 810, a local model report configuration including at least one of: a second resource for reporting an updated local model of the UE, a global model, or a report quantity of the updated local model of the UE; update a local model by training based on local data; and transmit, with wireless transceiver 810, an updated local model on the second resource.

In some embodiments, the second resource is indicated as a dynamic granted resource or a configured or preconfigured timing relative to a slot or sub-slot where the UE receives the local model report configuration.

In some embodiments, the local model report configuration is received via one of the following signaling: RRC signaling; MAC CE; DCI; or artificial intelligence related signaling.

In some embodiments, processor 820 is further configured to: receive, with wireless transceiver 810, a quantized scheduling indicator report configuration including at least one of: a third resource for reporting a quantized scheduling indicator of the UE, a second threshold for scheduling indicator, or a report quantity of the quantized scheduling indicator of the UE; calculate a scheduling indicator; and transmit, with wireless transceiver 810, the quantized scheduling indicator based on a comparison between the calculated scheduling indicator and the second threshold on the third report resource.

In some embodiments, the quantized scheduling indicator is an ACK in response to that the calculated scheduling indicator is less than the second threshold; or the quantized scheduling indicator is a NACK in response to that the calculated scheduling indicator is larger than or equal to the second threshold.

In some embodiments, apparatus 800 is a server. Processor 820 is configured to receive, with wireless transceiver 810, uplink channel state information between multiple UEs and a base station (BS); determine a first channel gain threshold and a number N based at least in part on the uplink channel state information, wherein the number N is a number of UEs to participate in local model training; and transmit, with wireless transceiver 810, a local model report configuration trigger message including at least one of: a report quantity indicating updated local models, the number N, an interim report quantity indicating multiple scheduling indicators, the first channel gain threshold, or a maximum latency for reporting local models, or a global model.

In some embodiments, the local model report configuration trigger message is transmitted via artificial intelligence related signaling.

In some embodiments, processor 820 is configured to determine the number N and the first channel gain threshold in response to at least one of: a new global model being applied; a global model convergence being achieved; or a convergence speed of a global model being lower than a desired speed.

In some embodiments, the first channel gain threshold is a value of a K-th largest channel gain among channel gains between the multiple UEs and the BS, wherein K is an integer larger than the number N.

In some embodiments, processor 820 is further configured to: receive, with wireless transceiver 810, updated local models of UEs from the BS; update a global model according to the updated local models; and in the case that convergence of the updated global model is not achieved: transmit, with wireless transceiver 810, the local model report configuration trigger message containing the updated global model to the BS for further local model training.

In some embodiments, processor 820 is further configured to: receive, with wireless transceiver 810, scheduling indicators of UEs from the BS; determine a second threshold for scheduling indicator according to the received scheduling indicators in the case that convergence of the updated global model is not achieved; and transmit, with wireless transceiver 810, the second threshold to the BS.

In various example embodiments, processor 820 may include, but is not limited to, at least one hardware processor, including at least one microprocessor such as a CPU, a portion of at least one hardware processor, and any other suitable dedicated processor such as those developed based on for example Field Programmable Gate Array (FPGA) and Application Specific Integrated Circuit (ASIC). Further, processor 820 may also include at least one other circuitry or element not shown in FIG. 8.

In various example embodiments, non-transitory computer-readable medium 830 may include at least one storage medium in various forms, such as a volatile memory and/or a non-volatile memory. The volatile memory may include, but is not limited to, for example, an RAM, a cache, and so on. The non-volatile memory may include, but is not limited to, for example, an ROM, a hard disk, a flash memory, and so on. Further, non-transitory computer-readable medium 830 may include, but is not limited to, an electric, a magnetic, an optical, an electromagnetic, an infrared, or a semiconductor system, apparatus, or device or any combination of the above.

Further, in various example embodiments, exemplary apparatus 800 may also include at least one other circuitry, element, and interface, for example antenna element, and the like.

In various example embodiments, the circuitries, parts, elements, and interfaces in exemplary apparatus 800, including processor 820 and non-transitory computer-readable medium 830, may be coupled together via any suitable connections including, but not limited to, buses, crossbars, wiring and/or wireless lines, in any suitable ways, for example electrically, magnetically, optically, electromagnetically, and the like.

The methods of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

The terms "includes," "comprising," "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The terms "including," "having," and the like, as used herein, are defined as "comprising."

What is claimed is:

1. A base station (BS), comprising:

at least one memory; and at least one processor coupled with the at least one memory and configured to cause the BS to:

obtain a number N and a first channel gain threshold, wherein the number N and the first channel gain threshold are determined based at least in part on uplink channel state information between the BS and multiple user equipments (UEs);

transmit, to each of the multiple UEs, a scheduling indicator report configuration to each of the multiple UEs;

receive multiple scheduling indicators; and select the number N of the multiple UEs to participate in local model training according to the multiple scheduling indicators.

2. The BS of claim 1, wherein the at least one processor is configured to cause the BS to obtain the number N and the first channel gain threshold in response to at least one of:

a new global model being applied;

a global model convergence being achieved; or a convergence speed of a global model being lower than a desired speed.

3. The BS of claim 1, wherein to obtain the number N and the first channel gain threshold, the at least one processor is configured to cause the BS to determine the number N based on the uplink channel state information and a historical number of iterations for convergence of a global model, and determine the first channel gain threshold based on the uplink channel state information.

4. The BS of claim 1, wherein to obtain the number N and the first channel gain threshold, the at least one processor is configured to cause the BS to:

transmit, to a server, the uplink channel state information to a server; and receive, from the server, the first channel gain threshold and the number N.

5. The BS of claim 1, wherein the scheduling indicator report configuration transmitted to a UE comprises at least one of:

a resource for reporting a scheduling indicator calculated by the UE;

the first channel gain threshold; or a report quantity indicating a report of the scheduling indicator of the UE.

6. The BS of claim 1, wherein the scheduling indicator report configuration is transmitted via one of:
radio resource control (RRC) signaling;
a medium access control (MAC) control element (CE);
downlink control information (DCI); or
artificial intelligence related signaling.

7. The BS of claim 1, wherein to select the number N of the multiple UEs to participate in the local model training, the at least one processor is configured to cause the BS to select the number N of the multiple UEs with smallest scheduling indicator values among the multiple scheduling indicators.

8. The BS of claim 1, wherein the at least one processor is further configured to cause the BS to:
transmit, to the number N of the multiple UEs, a local model report configuration; and
receive, from the number N of the multiple UEs, updated local models.

9. The BS of claim 8, wherein the local model report configuration transmitted to a UE comprises at least one of:
a resource for reporting an updated local model of the UE;
a global model; or
a report quantity indicating a report of the updated local model of the UE.

10. The BS of claim 8, wherein the at least one processor is further configured to cause the BS to:
update a global model according to the updated local models; and
if convergence of the updated global model is not achieved, then transmit, to the number N of the multiple UEs, the local model report configuration containing the updated global model for further local model training.

11. The BS of claim 8, wherein the at least one processor is further configured to cause the BS to:
receive, from a server, a local model report configuration trigger message comprising at least one of:
a maximum latency for reporting local models;
identifiers (IDs) of the multiple UEs;
a report quantity indicating a report of an updated local model;
the number N;
an interim report quantity indicating a report of a schedule indicator;
a global model; or
the first channel gain threshold; and
transmit, to the server, the updated local models which satisfy the maximum latency.

12. The BS of claim 8, wherein the at least one processor is further configured to cause the BS to:
update a global model according to the updated local models; and
if convergence of the updated global model is not achieved:
determine a second threshold for a scheduling indicator according to previously received scheduling indicators;
transmit, to the number N of the multiple UEs, a quantized scheduling indicator report configuration;
receive multiple quantized scheduling indicators; and
re-select the number N of the multiple UEs to participate in the local model training according to the multiple quantized scheduling indicators.

13. The BS of claim 11, wherein the at least one processor is further configured to cause the BS to:
receive, from the server, a second channel gain threshold for the scheduling indicator from the server;
transmit, to each of the multiple UEs, a quantized scheduling indicator report configuration;
receive multiple quantized scheduling indicators; and
re-select the number N of the multiple UEs to participate in the local model training according to the multiple quantized scheduling indicators.

14. A user equipment (UE) comprising:
at least one memory; and
at least one processor coupled with the at least one memory and configured to cause the UE to:
receive a scheduling indicator report configuration comprising at least one of a first resource for reporting a scheduling indicator calculated by the UE, a first channel gain threshold, or a report quantity indicating a report of the scheduling indicator of the UE;
calculate the scheduling indicator based at least in part on the first channel gain threshold; and
transmit the calculated scheduling indicator on the first resource.

15. A server comprising:
at least one memory; and
at least one processor coupled with the at least one memory and configured to cause the server to:
receive uplink channel state information between multiple user equipments (UEs) and a base station (BS);
determine a first channel gain threshold and a number N based at least in part on the uplink channel state information, wherein the number N is a number of UEs to participate in local model training; and
transmit a local model report configuration trigger message comprising at least one of a report quantity indicating a report of an updated local model, the number N, an interim report quantity indicating a report of a scheduling indicator, the first channel gain threshold, a maximum latency for reporting local models, or a global model.

16. The UE of claim 14, wherein the scheduling indicator report configuration comprising the first channel gain threshold is based at least in part on one or more of:
a new global model being applied;
a global model convergence being achieved; or
a convergence speed of a global model being lower than a desired speed.

17. The UE of claim 14, wherein the scheduling indicator report configuration is received via one of:
radio resource control (RRC) signaling;
a medium access control (MAC) control element (CE);
downlink control information (DCI); or
artificial intelligence related signaling.

18. The UE of claim 14, wherein the at least one processor is configured to cause the UE to receive a local model report configuration.

19. The UE of claim 18, wherein the local model report configuration comprises at least one of:
a resource for reporting an updated local model of the UE;
a global model; or
a report quantity indicating a report of the updated local model of the UE.

20. A processor for wireless communication, comprising:
at least one controller coupled with at least one memory and configured to cause the processor to:
receive a scheduling indicator report configuration comprising at least one of a first resource for reporting a scheduling indicator calculated by a user equipment (UE), a first channel gain threshold, or a report quantity indicating a report of the scheduling indicator of the UE;

calculate the scheduling indicator based at least in part on the first channel gain threshold; and transmit the calculated scheduling indicator on the first resource.

* * * * *